United States Patent [19]
Durham et al.

[11] Patent Number: 6,000,036
[45] Date of Patent: Dec. 7, 1999

[54] LOGICAL STEERING TO AVOID HOT SPOTS ON INTEGRATED CIRCUITS

[75] Inventors: Christopher McCall Durham; Peter Juergen Klim, both of Austin; Willem Bernard Van Der Hoeven, Round Rock, all of Tex.

[73] Assignee: International Business Machines Corp., Armonk, N.Y.

[21] Appl. No.: 08/682,472

[22] Filed: Jul. 17, 1996

[51] Int. Cl.$^6$ ............................................. G06F 1/32
[52] U.S. Cl. ............................................. 713/320; 713/330
[58] Field of Search ................... 395/750; 364/492, 364/557; 713/320, 330

[56] References Cited

U.S. PATENT DOCUMENTS

| | | | |
|---|---|---|---|
| 5,396,635 | 3/1995 | Fung | 395/800 |
| 5,418,969 | 5/1995 | Matsuzaki et al. | 395/750 |
| 5,452,277 | 9/1995 | Bajorek et al. | 569/54 |
| 5,452,401 | 9/1995 | Lin | 395/750 |
| 5,502,838 | 3/1996 | Kikinis | 395/550 |
| 5,655,124 | 8/1997 | Lin | 395/750 |
| 5,701,507 | 12/1997 | Bonneau, Jr. et al. | 395/800 |
| 5,712,999 | 1/1998 | Guttag et al. | 395/421.01 |

*Primary Examiner*—Ayaz R. Sheikh
*Assistant Examiner*—David A. Wiley
*Attorney, Agent, or Firm*—Winstead Sechrest & Minick P.C.; Anthony V. S. England

[57] ABSTRACT

A method and apparatus is provided for logical steering of instructions or operations to avoid power related hot spots on a microprocessor. The instructions are distributed to one of multiple units located within different areas of the integrated circuit. Each of the multiple functional units are identical or perform substantially the same function in response to the instruction. Power dissipation is measured within each of the areas in which a functionally equivalent unit is located. If the power dissipation within an area exceeds a predetermined amount or value, a localized heating problem exists within the area. The instruction is dispatched or routed to one of the other functional units located within an area not experiencing a localized heating problem, thus reducing the possibility of catastrophic failure due to overheating, decreasing overall chip power dissipation, increasing chip reliability, and increasing throughput.

20 Claims, 4 Drawing Sheets

LOGICAL STEERING TO AVOID HOT SPOTS ON INTEGRATED CIRCUITS

TECHNICAL FIELD OF THE INVENTION

The present invention relates to the reduction of power dissipation heating problems and, in particular, to the logical steering of functions or instructions to avoid localized heating areas or hot spots on an integrated circuit.

BACKGROUND OF THE INVENTION

Limiting power dissipation is one of the major goals when designing a microprocessor. Microprocessor power dissipation has substantially increased with the advent of new semiconductor technologies, increased density and complexity, and higher clock speeds.

Many current microprocessor designs have encountered problems where localized heating has forced the idling of particular portions (or functional units) of the microprocessor chip to prevent potentially fatal destruction. When this happens, overall microprocessor chip throughput is drastically reduced since the microprocessor must wait to perform the operation of the idled functional unit until any localized heating effect is not a threat.

Overall microprocessor chip throughput is measured in "SPEC" marks. The SPEC marks of a particular microprocessor are determined by running a number of standard programs and evaluating the microprocessor's performance, thus resulting in a given microprocessor throughput. As will be appreciated, shutting off functional units due to localized heating problems reduces the availability of those units to perform calculations or computations, thereby reducing the microprocessor throughput.

Prior attempts to combat localized heating have centered around the placement of functional units within the integrated circuit and powering off (disabling) units that are not required for certain operations. Strategically placed units may alleviate some localized heating problems, however, as chip densities increase and the performance of computational-intense programs and operations require functional units to operate relatively non-stop, placement or layout on the chip has little or no effect. Typical implementations for powering off units involve a central controlling unit that disables functional units not required based on incoming/upcoming instructions or operations.

Other attempts at improving SPEC throughput have focussed on adding multiple functional units. For instance, fixed point (or floating point) computational SPEC marks may be improved by adding a second fixed point functional unit to the microprocessor design. However, no consideration has been given as to which functional unit, in the case of multiple units of the same nature, to shut off or disable. Some attempts have simply used each of the functional units in some alternating fashion. Even with such techniques, localized heating problems with these functional units remains a problem due to the lack of consideration of actual power dissipation (or activity) within the neighborhood (area) of each functional unit.

Accordingly, there exists a need for an apparatus and method for decreasing localized heating problems associated with functional units within a microprocessor. Further, a need exists for an apparatus and method that provides information about the power dissipation in, and/or around, a given functional unit. In addition, an apparatus and method is needed for the logical steering of microprocessor instructions (or operations, functions) to reduce the possibility of any catastrophic failure(s) due to overheating, to increase microprocessor chip reliability, and to decrease overall average microprocessor chip power dissipation. Thus, logical steering of instructions to different functional units within separate neighborhoods is needed to reduce localized heating effects and increase microprocessor throughput.

SUMMARY OF THE INVENTION

According to the present invention, there is provided a circuit for distributing an instruction to one of a plurality of functional circuits each positioned within different areas of an integrated circuit. The circuit includes a first functional circuit positioned within a first area of the integrated circuit and a second functional circuit positioned within a second area of the integrated circuit. The first functional unit and the second functional unit are capable of performing substantially the same function in response to the instruction. The circuit further includes a first circuit for measuring or estimating power dissipation within the first area of the integrated circuit and generating a first signal relating to the measured or estimated power dissipation within the first area. A second circuit is provided for measuring or estimating power dissipation within the second area of the integrated circuit and generating a second signal relating to the measured or estimated power dissipation within the second area. The first signal and the second signal are processed and the instruction is routed to the first functional circuit for performance of an operation when the power dissipation in the second area exceeds a predetermined amount or to the second functional circuit when the power dissipation in the first area exceeds a predetermined amount.

In accordance with the present invention, there is provided a method of reducing power-related localized heating on an integrated circuit. A first functional unit is provided on an integrated circuit within a first area of the integrated circuit and a second functional unit is provided on the integrated circuit within a second area of the integrated circuit. The first functional unit and the second functional unit perform substantially the same function in response to an instruction. The method includes the steps of determining whether a localized heating problem exists within the first area of the integrated circuit and determining whether a localized heating problem exists within the second area of the integrated circuit. Depending on whether any localized heating problems are detected, the instruction is dispatched or routed to the one of the functional units not located within an area having a localized heating problem or to any one of the functional units if a localized heating problem exists within both the first area and the second area.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is made to the following description taken in conjunction with the accompanying drawings, wherein.

DETAILED DESCRIPTION OF THE INVENTION

Figure 1:
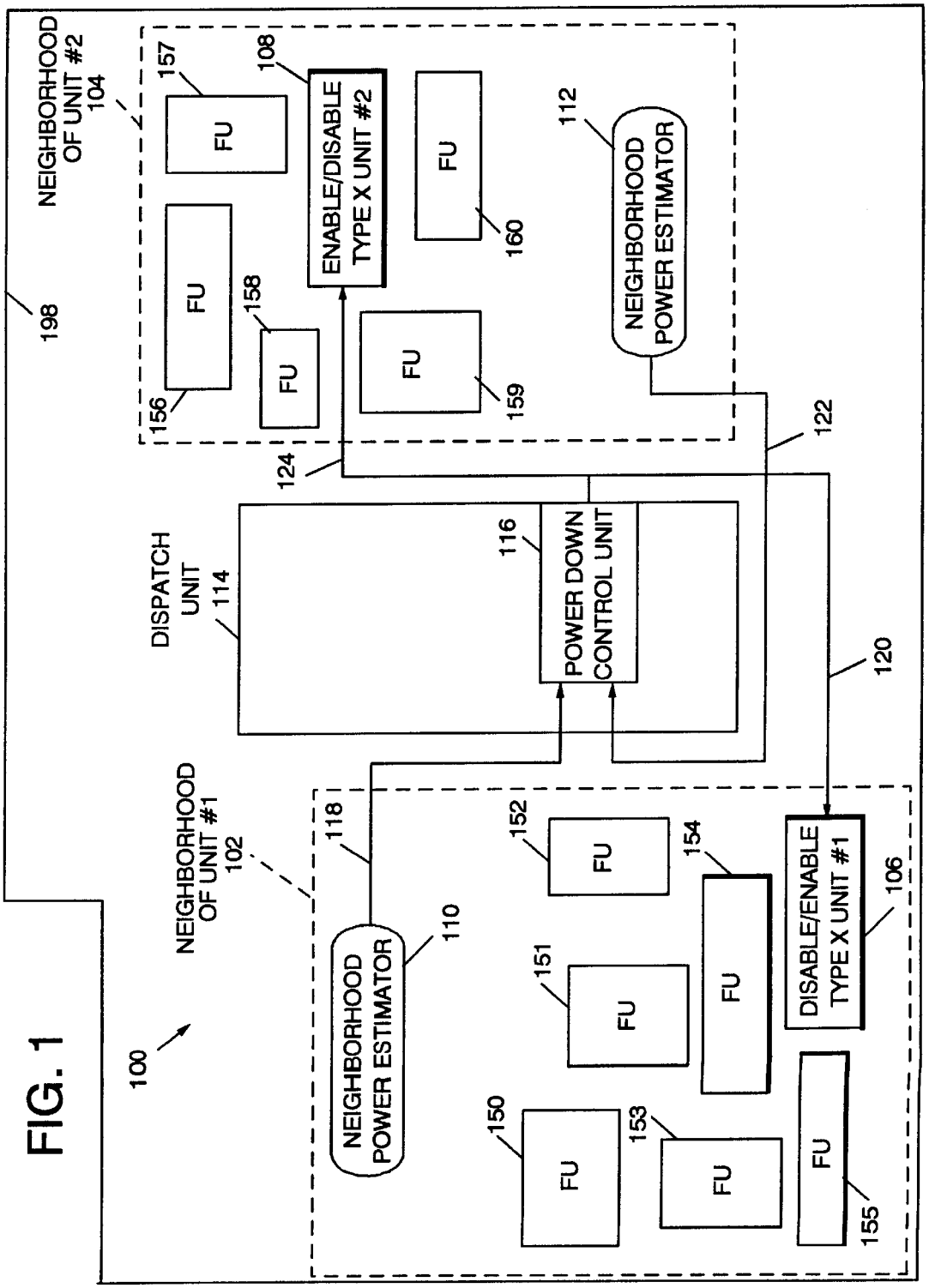
FIG. 1 illustrates an overall block diagram of a system in accordance with the present invention.

With reference to the drawings, like reference characters designate like or similar parts throughout the drawings.

Now referring to FIG. 1, there is shown an apparatus 100 to logically steer instructions in order to avoid "hot spots" on an integrated circuit 198. The apparatus 100 includes a first area 102 (or neighborhood) on the integrated circuit 198 and a second area 104 (or neighborhood). Within the first area 102 is a first functional unit 106, a power estimator 110, and other functional units or circuits 150, 151, 152, 153, 154 and 155. The other functional units or circuits 150, 151, 152, 153, 154 and 155 are of the type(s) typically found in a microprocessor (within the integrated circuit 198) and perform certain functions (i.e., units such as a floating and/or fixed point arithmetic logic unit (ALU), registers, bus interface, cache memory, a second smaller processor, and the like). The first functional unit 106 can be any type of circuit that performs a function in response to an instruction.

Within the second area 104 is a second functional unit 108, a power estimator 112, and other functional units or circuits 156, 157, 158, 159 and 160. The other functional units or circuits 156, 157, 158, 159 and 160 are of the type typically found in a microprocessor and perform certain functions (i.e., units such as a floating and/or fixed point arithmetic logic unit (ALU), registers, bus interface, cache memory, a second smaller processor, and the like). As will be appreciated, the functional units 150, 151, 152, 153, 154 and 155 within the first area 102 may be the same or similar to the functional units 156, 157, 158, 159 and 160 within the second area 104.

The first functional circuit or unit 106 and the second functional circuit or unit 108 may not be structurally identical. However, the first functional unit 106 and the second functional unit 108 perform substantially the same function or operation in response to an instruction. For example, if the first functional unit 106 is an ALU, then the second functional unit 108 would also be an ALU, if the first functional unit 106 is an on-chip cache memory, then the second functional unit 108 would be an on-chip cache memory, and so on.

The power estimator 110 located within the first area 102 measures or estimates the power dissipation within the first area 102. Similarly, the power estimator 112 located within the second area 104 measures or estimates the power dissipation within the second area 104. From the measured or estimated power (e.g. power dissipation) within the respective areas 102, 104, the power estimators 110, 112 also determine whether the power exceeds a predetermined amount or value within that respective area 102, 104. If the power in the first area 102 exceeds a predetermined amount, a localized heating problem exists within the first area 102 and this condition is transmitted over a signal line 118. Likewise, if the power in the second area 104 exceeds a predetermined amount, a localized heating problem exists within the second area 104 and this condition is transmitted over a signal line 122. As will be appreciated, measurements (or estimates) of power dissipation may be performed in one of several different ways know to those skilled in the art. For example, power measurements may be performed by using a current meter (with or without an A/D converter) to sense the current of the supply lines to the area, sensing temperature within the area, counting clock cycles of operation and/or counting instructions performed by the circuitry within the area, and the like.

The apparatus 100 also includes a dispatch unit 114 having a power down control unit 116. The power down control unit 116 receives, via signal lines 118, 122, information relating to the amount of power (power dissipation) within the first area 102 and the second area 104. If a localized heating problem is evident within any or all of the areas (or neighborhoods) 102, 104, then the dispatch 114 unit sends the instruction to the appropriate functional unit 106, 108 to be performed by the selected functional unit. It will be understood by those skilled in the art that the dispatch unit 114 performs "logical steering" to avoid power related "hot spots" on the integrated circuit 198 to distribute or dispatch an instruction (or instructions) to one of a plurality of functional units of the same type (i.e. perform the same or similar function, but located in different areas) in response to power dissipation within each area. As will be appreciated, the integrated circuit 198 may include more than two areas with each of the areas including a functional unit that can perform substantially the same function or operation in response to the instruction.

For example, suppose measured or estimated power dissipation within the first area 102 exceeds a predetermined amount. A localized heating problem is, therefore, detected within the first area 102 and this information is relayed to the power down control unit 116 via signal line 118. As such, the power estimator 110 has informed the dispatch unit 114 that a localized heating problem is occurring in the first area 102. Suppose further that the next pending instruction was scheduled for the first functional unit 106 within first area 102, and that another area 104 has a corresponding duplicate ("duplicate" meaning that another functional unit either is identical in form or function for at least that specific operation associated with the instruction) functional unit 108. The dispatch unit 114 then sends the instruction to the second functional unit 108 to perform the required operation and enables the second functional unit 108 via a signal line 124. In addition, the dispatch unit 114 disables the first functional unit 106 via a signal line 120 thereby placing the first functional unit 106 into a low power mode. This reduces the power dissipation within the first area 102 and further reduces both the localized heating problem within the first area 102 and the possibility of catastrophic failure due to overheating. When the localized heating problem in the first area 102 is no longer a problem and/or the first functional unit 106 is required for operation, the dispatch unit 114 enables the first functional unit 106 to receive the next instructions. As will be appreciated, some applications may force the functional unit 106 to operate, thereby neglecting the detected localized heating problem in its area, in order to attain a certain system throughput or other advantages.

Figure 2:
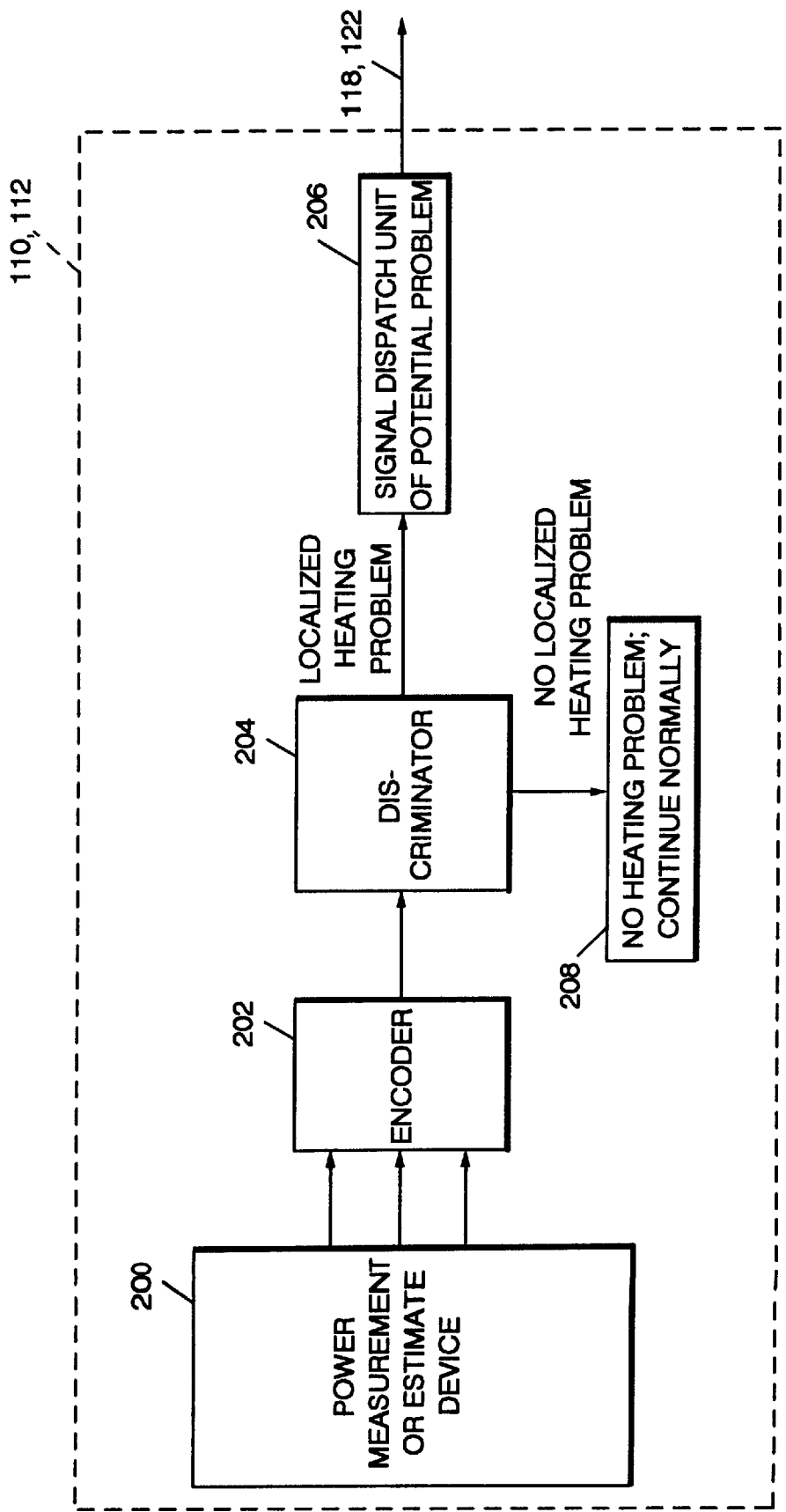
FIG. 2 is a more detailed illustration of a power estimator as shown in FIG. 1.

Now referring to FIG. 2, there is illustrated a more detailed diagram of the power estimators 110, 112. The power estimators 110, 112 measure or estimate power dissipation within the respective areas 102, 104 and determine when a localized heating problem exists within an area. Each power estimator 110, 112 includes a power measurement circuit 200 that estimates or measures power within each respective area In one embodiment, power dissipation within the respective area is measured or estimated for each functional unit within the respective area. As such, the power measurement circuit 200 within the first area 102 measures or estimates power dissipation of each of the individual functional units (the first functional unit 106 and the units A, B, C, D, E and F) within the first area 102. Likewise, the power measurement circuit 200 within the second area 104 measures or estimates power dissipation of each of the individual functional units (the second functional unit 108 and the units U, V, W, X and Y) within the second area 104.

Each power estimator 110, 112 further includes an encoder 202 that sums the measured or estimated power dissipation of the individual functional units within the area. The encoder 202 may be designed to weight the measured or estimated power from each individual functional unit. Weights are assigned based on priority, level of use, etc. Furthermore, a functional unit with a high density or with high power requirement when in use may require a higher weighing. As will be appreciated, weighing of the collected power information may be optional and is not required.

In another embodiment, the power measurement circuit 200 measures or estimates the power dissipation as a total for the respective area. For example, if the integrated circuit 198 is constructed such that power is supplied only to each respective area through a single voltage supply line (or identifiable multiple supply lines), power is measured at one (or multiple) point. As such, this may reduce the amount of circuitry required to measure power within the area as opposed to measuring power for each functional unit within the area and summing the measurements.

It will be understood by those skilled in the art that a number of means and/or circuits are available to determine, measure or estimate power dissipation within a respective area on an integrated circuit. The power measurement circuit 200 may be designed to measure the current of the supply lines or each supply line to each individual functional units (with or without an analog-to-digital (A/D) converter), measure temperature of the area or measure temperature at various points within the area, count the number of clock cycles for each functional unit operating within the area, count instructions, and the like. It will be appreciated that any circuit, means or method may be utilized if it performs the stated function of measuring or estimating power dissipation within each of the areas.

Once the power dissipation within an area is determined, the respective power estimator 110, 112 compares the measured or estimated power dissipation with a predetermined amount or value. This comparison is performed by a discriminator circuit 204 located, preferably, within the area under measurement. Alternatively, the discriminator 204 may be located nearer, or within, the dispatch unit 114. If the power dissipation in the area exceeds the predetermined amount set for that area, a localized heating problem has been detected within the respective area. Upon such a detection, the discriminator circuit 204 signals (block 206) to the dispatch unit 114 via the respective power estimator indicator signal 118, 122. If no localized heating problem is detected, the discriminator circuit 204 signals (block 208) to continue normal operation.

Figure 3:
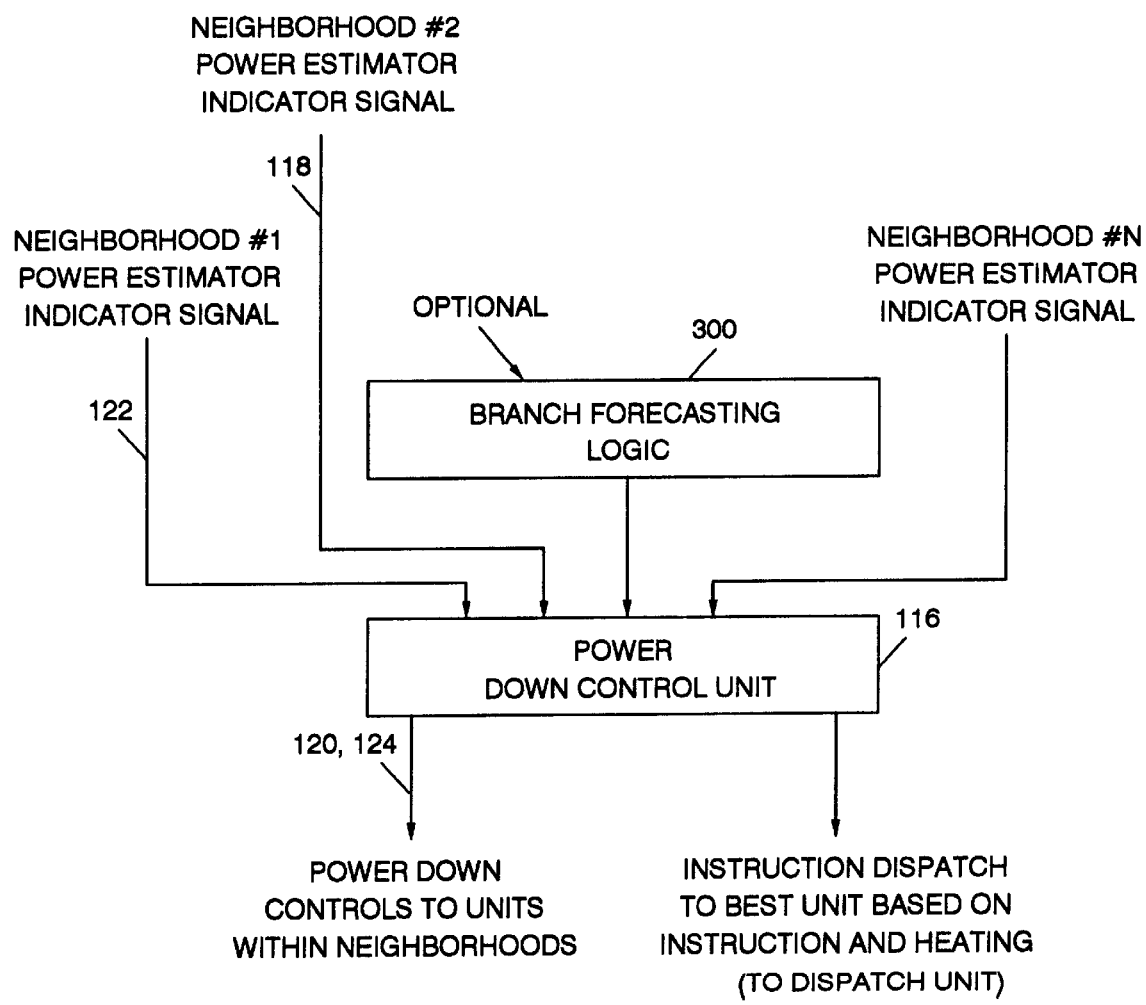
FIG. 3 is a more detailed illustration of a power down control unit.

Now referring to FIG. 3, there is illustrated a more detailed diagram of the power down control unit 116. The power down control unit 116 receives the power estimator indicator signals 118, 122 from the respective areas 102, 104. As will be appreciated, there will be n number of indicator signals depending on the number of areas comprising an equivalent functional unit. The power down control unit 116 is part of the dispatch unit 114. The dispatch unit 114 may include branch forecasting logic 300 and/or unit availability tracking logic (not shown) which are generally present in power down control units. The present invention adds the power estimator indicator signals 118, 122 to determine if and where a localized heating problem is present in a particular area. From the input signals (e.g. indicator signals, branch forecasting signals (optional), unit availability signals (optional)), the power down control unit 116 not only determines which of the functional units 106, 108 to receive the instruction based on operation (or function) type, but also determines which area 102, 104, and hence, which of the first or second functional units 106, 108, is best suited to reduce localized heating problems or effects. Once this is determined, the dispatch unit 114 dispatches or routes the instruction to the selected desired functional unit to perform the corresponding operation or function. Meanwhile, the power down control unit 116 disables functional unit(s) within the area(s) where a localized heating problem exists (i.e. has been detected).

Figure 4:
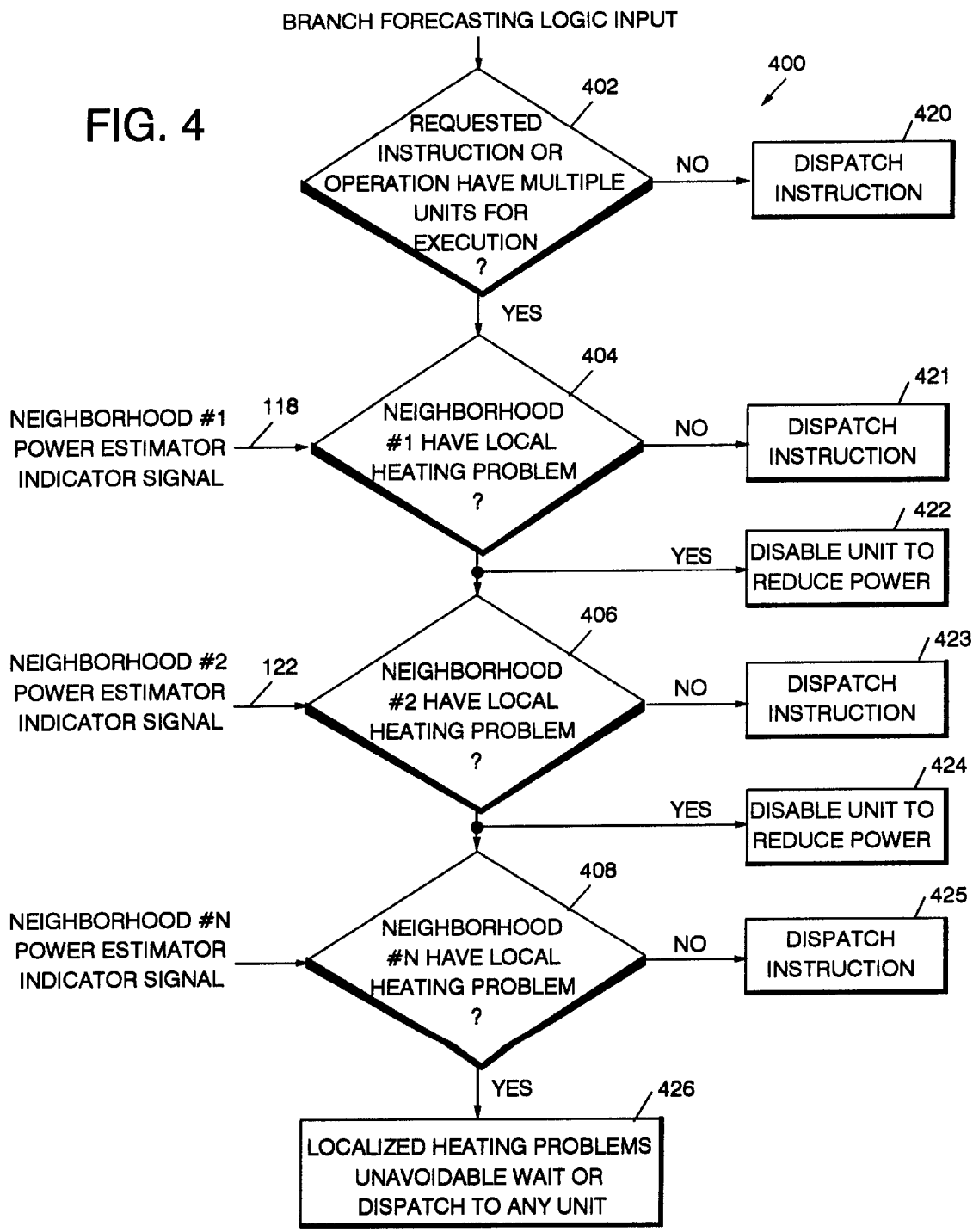
FIG. 4 is a basic flow diagram of the method for dispatching an instruction to one of the functional units.

Now referring to FIG. 4, there is illustrated a basic flow diagram 400 of a method for dispatching an instruction to one of the functional units. One skilled in the art will be able to design circuitry within power down control unit 116 using the flow diagram 400. The flow diagram 400 determines which functional unit receives the instruction based upon the area (neighborhood) power dissipation (localized heating) information. At a step 402, a determination is made as to whether multiple functional units exist to perform the requested instruction or operation. If not, the dispatch unit 114 dispatches or routes (block 420) the instruction to the appropriate functional unit. If two or more such functional units exist, an inquiry is made as to whether a localized heating problem exists within each of the respective areas of each functional unit.

At a step 404, if the power estimator indicator signal 118 indicates that no localized heating problem is present within the first area 102, the instruction is dispatched or routed (block 421) to the first functional unit 106 to be performed. However, if a localized heating problem is detected, the first functional unit 102 is disabled (block 422), and the process continues. At a step 406, if the power estimator indicator signal 122 indicates that no localized heating problem is present within the second area 104, the instruction is dispatched or routed (block 423) to the second functional unit 106 to be performed. However, if a localized heating problem is detected, the second functional unit 102 is disabled (block 424), and the process continues until the power dissipation (determined from the indicator signal) of the nth area having a functional unit, at a step 408, is examined. If the nth area does not have a localized heating problem, the instruction is dispatched or routed (block 425) to the nth functional unit to be performed. But if the nth area also has a localized heating problem, local heating problems are unavoidable (block 426) and the dispatch unit will either wait a period of time before dispatching the instruction to any unit, repeat the steps beginning with step 404, dispatch the instruction to any unit, dispatch to a particular unit based on a default, etc. As will be appreciated, the flow 400 is not required to inquire sequentially into the power dissipation of the first area, second area, the nth area, but may be arranged in any manner.

The present invention allows microprocessor designers to logically steer instructions or (functions) to different units within separate areas in response to the estimated or measured power dissipation within, or at, various areas of the microprocessor or integrated circuit.

Although the present invention and its advantages have been described in the foregoing detailed description and illustrated in the accompanying drawings, it will be understood by those skilled in the art that the invention is not limited to the embodiment(s) disclosed but is capable of numerous rearrangements, substitutions and modifications without departing from the spirit and scope of the invention as defined by the appended claims.

What is claimed is:

1. A circuit for distributing an instruction to one of a plurality of functional units each positioned within a different area of an integrated circuit, comprising:

a plurality of functional units capable of performing a substantially same operation in response to the instruction, each functional unit positioned within a corresponding one of a plurality of areas on the integrated circuit;

a plurality of power estimators, each of the power estimators measuring or estimating power dissipation within a corresponding one of the plurality of areas; and circuitry for processing the measured or estimated power dissipation of each of the plurality of areas and routing the instruction to a one of the plurality of functional units within the corresponding one of the plurality of areas to perform the operation when the measured or estimated power dissipation within another of the plurality of areas exceeds a predetermined amount.

2. The circuit in accordance with claim 1 wherein the circuitry comprises:

a plurality of discriminator circuits, each of the discriminator circuits corresponding to a one of the plurality of areas and receiving the measured or estimated power dissipation from the corresponding area and generating an indicator signal when the measured or estimated power dissipation within the corresponding area exceeds a predetermined amount.

3. The circuit in accordance with claim 2 wherein each discriminator circuit is positioned structurally within the area to which it corresponds.

4. The circuit in accordance with claim 2 wherein the circuitry further comprises:

a unit power down control circuit receiving and processing the indicator signals generated by the plurality of discriminator circuits and for selecting one of the plurality of areas in response to the indicator signals; and a dispatch unit for dispatching the instruction to the one of the plurality of functional units corresponding to the selected one of the plurality of areas to reduce localized heating effects.

5. The circuit in accordance with claim 4 wherein the dispatch unit disables the other functional units.

6. The circuit in accordance with claim 1 wherein the circuitry further comprises:

a unit power down control circuit receiving and processing the measured or estimated power dissipation from each of the plurality of areas for detecting whether a localized heating problem is present within one or more of the plurality of areas; and a dispatch unit for dispatching the instruction to one of the functional units corresponding to one of the plurality of areas where no localized heating problem has been detected to reduce localized heating effects.

7. The circuit in accordance with claim 6 wherein the dispatch unit disables the functional units corresponding to any areas where a localized heating problem has been detected.

8. The circuit as recited in claim 1, wherein the functional units are execution units located within a single microprocessor.

9. A circuit for distributing an instruction to one of a plurality of functional circuits each positioned within different areas of an integrated circuit, comprising:

a first functional circuit positioned within a first area of the integrated circuit;

a first circuit for measuring or estimating power dissipation within the first area of the integrated circuit and generating a first signal relating to the measured or estimated power dissipation within the first area;

a second functional circuit positioned within a second area of the integrated circuit, the first functional unit and the second functional unit capable of performing substantially the same function in response to the instruction;

a second circuit for measuring or estimating power dissipation within the second area of the integrated circuit and generating a second signal relating to the measured or estimated power dissipation within the second area; and circuitry for processing the first signal and the second signal and routing the instruction to the first functional circuit for performance of an operation when the power dissipation in the second area exceeds a predetermined amount or to the second functional circuit when the power dissipation in the first area exceeds a predetermined amount.

10. The circuit in accordance with claim 9 wherein the first circuit comprises:

a first power sensing circuit measuring or estimating the power dissipation within the first area, and a first discriminator circuit for comparing the measured or estimated power dissipation within the first area to a first predetermined amount and generating the first signal when the power dissipation within the first area exceeds the first predetermined amount; and the second circuit comprises, a second power sensing circuit measuring or estimating the power dissipation within the second area, and a second discriminator circuit for comparing the measured or estimated power dissipation within the second area to a second predetermined amount and generating the second signal when the power dissipation within the second area exceeds the second predetermined amount.

11. The circuit in accordance with claim 10 wherein the circuitry for processing comprises:

a unit power down control circuit receiving and processing the first signal and the second signal and selecting one of the first or second functional units to receive the instruction; and a dispatch unit for dispatching the instruction to the selected functional unit for performance of the instruction thereby reducing localized heating effects within the area containing the nonselected functional unit.

12. The circuit in accordance with claim 11 wherein the dispatch unit disables the nonselected functional unit.

13. The circuit in accordance with claim 9 wherein the circuitry for processing comprises:

a unit power down control circuit receiving and processing the first signal and the second signal and selecting one of the first or second functional units to receive the instruction; and a dispatch unit for dispatching the instruction to the selected functional unit for performance of the instruction thereby reducing localized heating effects within the area containing the nonselected functional unit.

14. The circuit in accordance with claim 13 wherein the dispatch unit disables the nonselected functional unit.

15. The circuit as recited in claim 9, wherein the functional units are execution units located within a single microprocessor.

16. A method of reducing power-related localized heating on an integrated circuit comprising the steps of:

providing a first functional unit on an integrated circuit within a first area of the integrated circuit;

providing a second functional unit on the integrated circuit within a second area of the integrated circuit, the first functional unit and the second functional unit capable of performing substantially the same function in response to an instruction;

determining whether a localized heating problem exists within the first area of the integrated circuit;

determining whether a localized heating problem exists within the second area of the integrated circuit;

dispatching the instruction to the one of the first functional unit or the second functional unit not located within an area having a localized heating problem or to any one of the first or the second functional units if a localized heating problem exists within both the first area and the second area.

17. The method in accordance with claim 16 wherein the step of dispatching the instruction includes the steps of:

enabling the functional unit to which the instruction is dispatched; and disabling the functional unit located within the area having a localized heating problem.

18. The method in accordance with claim 16 wherein the step of determining whether a localized heating problem exists within the first area includes the steps of, measuring or estimating the power dissipation within the first area; and comparing the measured or estimated power dissipation with a first predetermined amount and determining that a localized heating problem exists within the first area when the power dissipation exceeds the first predetermined amount; and the step of determining whether a localized heating problem exists within the second area includes the steps of, measuring or estimating the power dissipation within the second area; and comparing the measured or estimated power dissipation with a second predetermined amount and determining that a localized heating problem exists within the second area when the power dissipation exceeds the second predetermined amount.

19. The method in accordance with claim 18 wherein the step of dispatching the instruction includes the steps of:

enabling the functional unit to which the instruction is dispatched; and disabling the functional unit located within the area having a localized heating problem.

20. The method as recited in claim 16, wherein the functional units are execution units located within a single microprocessor.

* * * * *